(12) United States Patent
Strait et al.

(10) Patent No.: US 7,383,336 B2
(45) Date of Patent: Jun. 3, 2008

(54) DISTRIBUTED SHARED RESOURCE MANAGEMENT

(75) Inventors: Gary E. Strait, Poughkeepsie, NY (US); Gary A. Van Huben, Poughkeepsie, NY (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 10/422,864

(22) Filed: Apr. 24, 2003

(65) Prior Publication Data

US 2004/0215773 A1    Oct. 28, 2004

(51) Int. Cl.
*G06F 15/173* (2006.01)
*G06F 9/46* (2006.01)

(52) U.S. Cl. .................. 709/226; 718/103; 718/104; 719/312; 719/319; 719/328; 719/330; 711/146; 711/147; 711/148; 710/28

(58) Field of Classification Search ................ 709/216, 709/217, 218, 232, 251; 710/28; 711/147, 711/146, 148; 718/103, 104; 719/312, 319, 719/328, 330
See application file for complete search history.

(56) References Cited

U.S. PATENT DOCUMENTS 5,197,130 A    3/1993   Chen et al.
7,016,969 B1 *  3/2006   Uzun et al. .................. 709/233
2002/0083243 A1  6/2002   Van Huben et al.

FOREIGN PATENT DOCUMENTS

EP    0945798 A    9/1999

OTHER PUBLICATIONS

"Enabling Multimedia Communications Over the Token Ring," IBM Technical Disclosure Bulletin, vol. 36, No. 07, Jul. 1, 1993, pp. 495-496.

* cited by examiner

*Primary Examiner*—Ashok Patel
(74) *Attorney, Agent, or Firm*—Lynn L. Augspurger (57) ABSTRACT

A method for processing data in a computer system using two main concepts for addressing this situation, from which numerous other implementations is achieved using a first and second main concept. The first is a method of managing a common data path among a plethora of facilities with a decentralized distributed management scheme. The second concept is a method for managing a shared data buffer or group of buffers between multitudes of facilities. By employing the concepts discussed in this invention, one can contemplate a complex dataflow consisting of a multiplicity of resources and data paths, whereby virtually any combination of sharing is possible. A single data path can be shared among multiple sources or sinks. A single resource can be shared, but may have many separate data paths, or all elements of the present invention can be combined to comprise a dataflow with shared resources and shared data paths, both of which are actively managed by completely independent controllers on a separate chip or on the same chip, but with a segregated dataflow.

11 Claims, 7 Drawing Sheets

DISTRIBUTED SHARED RESOURCE MANAGEMENT

FIELD OF THE INVENTION

This invention is related to computers and computer systems and in particular to the area of shared resource management through distributed management facilities.

TRADEMARKS

IBM® is a registered trademark of International Business Machines Corporation, Armonk, N.Y., U.S.A. Other names may be registered trademarks or product names of International Business Machines Corporation or other companies.

BACKGROUND

Historically, resource management and contention between resources were handled through central management facilities, which favored one request over another or through any of a multitude of other contention handling methods. This management scheme normally took the form of a central arbitration facility which requesters would raise requests to, while the arbitration facility would determine points of contention and return grants to the appropriate requester, effectively giving it priority to use a shared facility.

Shared management of resources within a computer system is undoubtedly an area of growing importance with the increasing complexity of the computing environment. There are many examples of prior art relevant to the present subject matter. U.S. Pat. No. 4,399,504, entitled Method and Means for the Sharing of Data Resources in a Multiprocessing, Multiprogramming Environment, issued to Obermarck et al., and U.S. Pat. No. 4,604,694, entitled Shared and Exclusive Access Control, issued to Hough, and U.S. Pat. No. 5,414,856, entitled Multiprocessor Shared Resource Management System Implemented as a Virtual Task in One of the Processors, issued to Yokota are three examples employing methods of locking and sharing computer system resources required by applications or tasks running in a multiprocessing environment. These applications focus primarily on the software interaction with the operating system and employ programming facilities to implement the inventions.

U.S. Pat. No. 5,115,499, entitled Shared Computer Resource Allocation System Having Apparatus for Informing a Requesting Computer of the Identity and Busy/Idle Status of Shared Resources by Command Code, issued to Stiffler et al., teaches a resource allocation system to permit each processor in a multiprocessing environment to gain temporary exclusive control of a resource to accomplish a particular task. This invention employs both hardware and software facilities wherein the hardware facilities permit a test-and-set procedure to interrogate the status of a resource and provide a means for locking said resource on behalf of a requesting processor.

U.S. Pat. No. 5,887,160, entitled Method and Apparatus for Communicating Integer and Floating Point Data Over a Shared Data Path in a Single Instruction Pipeline Processor, issued to Lauritzen et al., demonstrates a processor pipeline data flow in wherein the same data path is used to convey integer and floating point results to and from various stages of the pipeline without the need for the Floating Point and Integer Units to employ separate and distinct data flows.

While all of the aforementioned inventions teach various methods related to resource management in a computer system, they individually and collectively, fail to provide a hardware means for arbitrating and managing general purpose, shared data paths in high frequency, large scale SMP systems.

With the growth in the number of requesters, resources, data sources, data sinks, increasing chip density, and increasing clock frequency, the level of interconnection in a system has become difficult at best to manage. Problems with wiring contention, timing issues, and space within a chip floorplan have driven the need for an alternative solution to this. This solution must be scalable and does not result in other problems in a system design or performance.

SUMMARY OF THE INVENTION

In describing our preferred embodiment of our invention we will describe a method for processing data in a computer system using two main concepts for addressing this situation, from which numerous other implementations can be derived. The first is a method of managing a common data path among a plethora of facilities with a decentralized distributed management scheme. The second concept is a method for managing a shared data buffer or group of buffers between multitudes of facilities.

By employing the concepts discussed in this invention, one can contemplate a complex dataflow consisting of a multiplicity of resources and data paths, whereby virtually any combination of sharing is possible. A single data path can be shared among multiple sources or sinks. A single resource can be shared, but may have many separate data paths, or all elements of the present invention can be combined to comprise a dataflow with shared resources and shared data paths, both of which are actively managed by completely independent controllers on a separate chip or on the same chip, but with a segregated dataflow. These controllers can either be synchronous or asynchronous in nature, thereby increasing the scope of the invention across a variety of applications.

These and other improvements are set forth in the following detailed description. For a better understanding of the invention with advantages and features, refer to the description and to the drawings.

DETAILED DESCRIPTION

Our preferrred embodiments present two methods for managing shared resources. The first method addresses the issue of handling a resource that is shared by a plurality of logical entities which operate using a synchronous control flow with respect to each other. The second method handles the case in which the resource is shared by a combination of synchronous and asynchronous controllers.

In both cases, the following advantages exist:

The dataflow elements are entirely governed by the controllers operating remotely. The dataflow elements themselves have no active management components for detecting or avoiding collisions. This simplifies the design of the dataflow elements and improves overall efficiency by not requiring any type of handshaking between the controllers and dataflow prior to starting the data transfer.

The controllers are free to operate completely independent of one another, entirely in parallel. At any point in time they can all be performing operations which require the shared resource.

The resource management is performed without the need for any of the controllers to communicate directly with each other.

This allows a multitude of controllers to be replicated in order to improve system performance, without placing additional demands on the wiring topology.

As a result of these advantages, this invention is ideally suited for addressing the issues that are becoming more predominant in multiprocessor system design. With the increasing multitude of requesters within a system, centralized management logic for handling requests from these requester's can not continue to scale under traditional methodologies even with the current rate of improvement in silicon technologies. This invention allows for the management logic to become decentralized for groups of requesters and places this logic within said groups of requesters or in remote priority stations. This permits critical resources to remain within a centralized management cone of logic, while requester groups manage their own priority and shared facilities, and use the centralized facilities only as necessary and as the shared resources are available. This alleviates the number of physical design issues that would be encountered in the control flow of such a design while simplifying the dataflow at the same time.

PREFERRED EMBODIMENT 1

The first preferred embodiment teaches a method for managing a common data path among a plethora of facilities with a decentralized distributed management scheme.

This embodiment is envisioned as blocking logic contained within decentralized pre-priority stations centered around a centralized multistage pipeline (priority facility) in a system with a segregated dataflow. The segregated dataflow acts as a slave device to the control side, in that communication is only sent from the control side to the data side and no communication in the opposite direction is required.

In this system any requester requiring use of the dataflow would have to make pipe passes through the centralized pipeline in order to have control signals sent over to the dataflow to begin the movement of data. As each requester sends a request through the centralized pipeline, information about the pipe pass is communicated to other requesters in the system through a broadcast of information from the central pipeline, including information such as address, requester id's, and other relevant information. In addition, other information is broadcast from other areas in response to this pipeline pass, including address compares and cache hit information. This is commonly done in pipelined systems as a method of maintaining system coherency, generating data movements, indicating if a granted requester's pipe pass was valid, resolving points of contention, etc.

In this manner, our preferred embodiment uses this existing communication of information resulting from the pipeline pass to determine if a given requester in the system was given priority to use a resource that is shared. In such cases, the resource is tagged as busy for an appropriate number of cycles in blocking logic within the pre-priority stations, as determined by the requester and operation type observed going through the pipeline, and any other requester looking to use said resource are prevented from doing so until the resource is no longer in use. In traditional pipelined systems, each requester would have dedicated resources where possible and shared elements would be actively managed by a centralized controller. This controller would typically comprise a means of arbitrating between a plurality of requesters with simultaneous access requests pending. The arbitration logic would guarantee that either the granted requesters were able to use the resource(s) that they required, or the requesters would cancel their pipe pass once they realized that the required resource(s) were in use and before a collision could occur. This resulted in a more complex central controller design, which would usually have timing and wiring problems associated with it as a result of the number of requesters and resources and the criteria to check in making a selection. Furthermore, wasted pipe cycles would occur as a result of requesters receiving late signals about resource availability and having to cancel pipe passes. Unfortunately today's high frequency large SMP systems enlist such complex and congested control and data flows that dedicated resources for each requester is normally impossible. Furthermore, as cycle times diminish and the number of requesters increase, access to a single centralized controller is becoming impractical.

Our embodiment takes this type of management scenario to the next level by removing the management of the shared resources from the central priority station, effectively reducing the complexity, size and timing problems associated with it, and placing it within pre-priority stations. Under a standard type of implementation with traditional design techniques, this would result in a centralized arbitration facility or prediction logic that would inform the requesters or pre-priority stations as to the availability of the shared facilities, but in our embodiment it was decided to use existing signals from the central priority station to determine if a requester was using a shared data resource. Also, rather than having one pre-priority station for requesters that needed to use this ancillary shared resource, a multitude of pre-priority stations were designed in order to allow for a more ideal placement of this logic in the design and eliminate the need for a multitude of requesters sending signals to one facility, which would lead to chip wiring problems.

Each station functions independently of the others and has no method of directly communicating with any other pre-priority station in the system. As a requester makes a pipe pass through the central pipeline in the system, the pre-priority stations tag the shared facility that is being used as in use for a given number of cycles. This is accomplished by observing the requests flowing through the pipeline and recognizing those that cause shared resources to be consumed. This is then used to enable blocking counters that block any other requesters from using the shared facility until it is available and also prevents them from making pipe passes in which use of the shared resource is requested until this condition is met. In doing so, pipe passes are avoided and effectively saved through not having to cancel them, and other requesters under the pre-priority station are effectively given higher priority than requesters waiting on a shared resource, thereby being able to make pipe passes, so long as they do not require the use of the shared resource. In this manner, efficient selection of requesters for access into the central pipe is done and overall system efficiency is improved.

In the actual embodiment of the z-series server, this management methodology takes the form of a plurality of Local Store Controllers (LSARs) that share a common data path with a plurality of I/O Requesters (MARs). Each LSAR and MAR share a common data path to transfer data from a given plurality of MAR facilities to any of a plurality of LSAR data buffers or MAR interleave buffers. The LSAR data buffers were then used to transfer data to the Memory Interface Controller (MIC), while the MAR interleave buffers were used to transfer data to the local system cache. The LSAR and MAR facilities operate independently and asynchronously with respect to each other. Therefore the pattern of use for the shared data path could not be predicted and therefore its use could only be mitigated.

The choice of using this methodology for these facilities is important due to the relatively higher priority these requesters have in the central priority station selection logic and therefore the greater impact to system performance that would be seen in preventing them from making pipeline passes to discover shared resource availability thereby allowing lower priority requesters to utilize the pipeline cycles. Through this change, contention management detection and handling logic is removed from the central pipeline and relocated into the pre-priority stations, allowing for an overall simplification in the design of the central pipeline and an improvement in system performance, chip wiring, and associated timing issues.

PREFERRED EMBODIMENT 2

In addition to active management of shared data busses, our invention also employs active management of shared dataflow resources such as buffers. This enables a reduction in the number of dataflow resources in order to permit a reasonable physical implementation. However, since this approach has the potential to cause queuing, it's imperative to manage the resource in an efficient manner.

This preferred embodiment incorporates a plurality of Remote Store Controllers (RSARs) which share a single line buffer. Each RSAR writes into and reads from the buffer using a synchronous operation whose overall sequence is controlled by a centralized multistage pipeline. When an RSAR wants to enter the pipeline to initiate a write to the buffer, it makes a request to a localized reservation facility. Since each RSAR operates completely independently, the potential exists for all of them to reserve the buffer simultaneously. The localized reservation facility uses a priority scheme (such as round robin or ranked priority) to select one of the RSARs. Upon selection, the resource is marked as busy, and the selected RSAR is granted permission to use the buffer.

In the preferred embodiment, the RSARs and the localized reservation facility all reside within the same physical macro thereby eliminating any chip-level wires. Once the buffer is reserved, RSAR is allowed to initiate a synchronous pipeline pass to begin transferring data into the buffer. By reserving the shared dataflow resource in advance, the RSAR operation will always make successful pipe passes. This provides overall system efficiency as no pipe cycles are ever wasted or canceled. Since the data transfer occurs on a given pipe cycle, there only needs to be a single control bus directing the dataflow, which indicates source and sink information. In this case, the sink is the shared resource. The source of the transfer could be a single entity with a dedicated data path, a plurality of entities each with a dedicated data path or a plurality of entities sharing an actively managed data path whose novelty is also taught in the present invention.

In order to maximize efficiency, our invention further contemplates a localized reservation system which retains the shared resource not only during the write operation, but also until a read operation is initiated. Since the buffer is unusable by any other controller until the data is read out, there is no need for the RSAR which currently has control to relinquish control. Instead, the preferred embodiment teaches a mechanism to link a synchronous read operation with the synchronous write operation thereby allowing RSAR to immediately enter the centralized pipeline with a buffer read sequence as soon as the write sequence is underway. The only requirement is that the destination of the data being read out of the buffer is available. Once again, since the read operation is governed by a particular cycle of the centralized pipeline, there only needs to be a single control facility distributed to the dataflow, no matter how many controllers share the resource. In cases where the final destination is available, the present invention allows the read to overlap the write so as to pipeline the data transfer through the buffer. As soon as the read operation commences, the localized reservation facility is able to allocate the buffer to another RSAR which has a reservation request pending.

The preferred embodiment allows that write operation to initiate while the previous read operation is still in progress in order to maximize throughput of the shared resource. In large scale systems such as z-series, the sharing of dataflow resources is potentially detrimental to system performance. However these effects can be mitigated if the shared resource is efficiently managed and communication overhead is kept to a minimum. For example, with the controllers and dataflow being on two separate chips, a solution requiring the controllers to communicate with the dataflow chip in order to reserve the resource would be too costly for performance. Our invention retains all of the management within the control chip, and in the case of a shared resource among a common controller, the invention further improves system efficiency by eliminating the need for a common management facility (such as the centralized pipeline).

The aforementioned example with the RSAR controllers contemplates a mechanism for managing a shared resource used for synchronous data transfers such as those governed by a centralized pipeline. In these cases, there can only be a single transfer initiated on any given clock cycle. However, one must also contemplate the case whereby a resource is shared between controllers such that one or more of them is asynchronous in nature. Our invention also addresses this situation by teaching a method for sharing a buffer between a synchronous controller (such as RSAR) and an asynchronous controller such as a Memory Interface Controller (MIC). In the preferred embodiment, since RSAR is responsible for processing remote storage requests, it sometimes has to move data into the cache while other times it must move the data out to main memory. Main memory transfers require making requests to the Memory Interface Controller (MIC) who is responsible for transferring the data from the buffer onto the memory interface. The most common solution would be to use separate buffers for each type of operation. The data would either be steered to the proper buffer in advance (if the final destination is determinable); otherwise a buffer to buffer data transfer would be required. However, the present invention eliminates the need for the second buffer by demonstrating a mechanism which allows asynchronous memory requests to coincide with synchronous pipeline operational sequences.

For example, if an RSAR needs to store the data into the cache, it must make a pipe pass through the centralized pipeline to initiate a read out of this shared storage buffer. On the other hand, if RSAR needs to store the data to main memory, it must make a memory request to the MIC, who in turn, reads the data out of the shared storage buffer. Since two disparate controllers need to direct read operations out of this buffer, a means must exist to manage the buffer. Unfortunately, the MIC is not a synchronous controller, thereby making the centralized pipeline unsuitable as a means for active management. Our invention solves this by using the aforementioned localized reservation facility to monitor RSAR requests to the MIC. If one RSAR needs to store into the cache and is attempting to reserve the buffer, while a second RSAR is making a request to the MIC to transfer data out to main memory, our invention teaches a means whereby once an RSAR receives a grant from the MIC, it automatically reserves the buffer and locks out any other RSAR trying to initiate a synchronous data transfer to the cache. It performs this in such a way as to avoid collisions and never has to interrupt a transfer in progress. Furthermore, no pipe passes are wasted and no extra communication is required between RSAR and the MIC.

DETAILED DESCRIPTION OF THE PREFERRED EMBODIMENT

Figure 1:
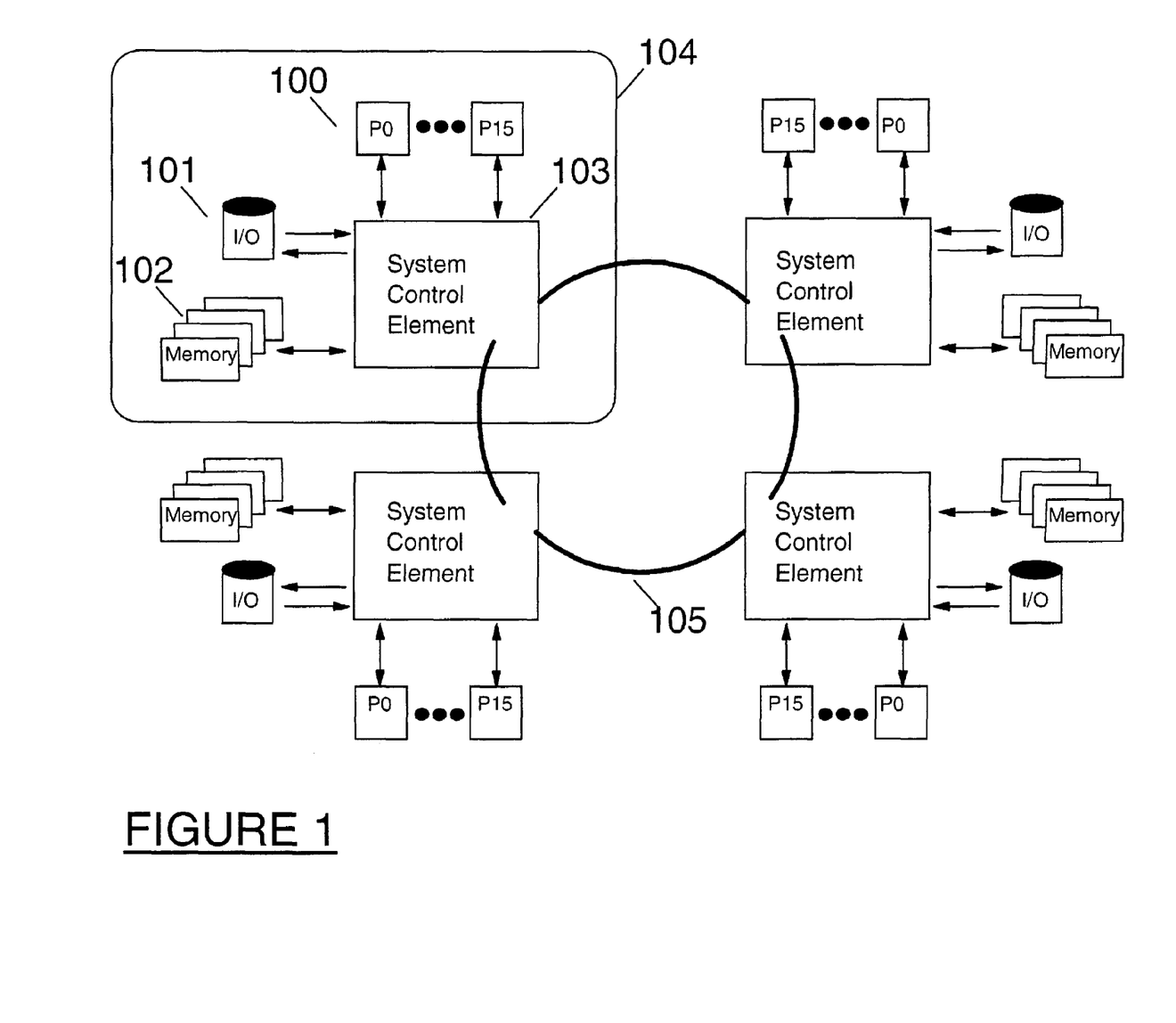
FIG. 1 depicts the overall structure of a multi-nodal computer system comprising Central Processors, I/O devices, Main Memory and a ring-like interconnect topology.

From the accompanying FIG. 1 it will be seen that this embodiment depicts four nodes in a multi-nodal symmetric multiprocessor system. A single node (104) comprises the aforementioned System Controller Element (103) which provides interconnections and communications with a plurality of Central Processors (100), I/O devices (101), and main memory (102). The System Controller Element (103) contains the shared second level cache. Both the L2 cache and the main memory are accessible by a Central Processor or I/O devices within that node (104) or any of the remaining three nodes in the system. Communication to the remaining three nodes is done through the ring fabric (105). The ring fabric consists of two concentric rings in which traffic flows in opposite directions. Operations destined for other nodes are launched onto both rings simultaneously. For matters of system level coherency, both operations must pass through each adjacent node and meet at the diagonally opposite node, before being sent on with a combined response for the request. Fetch and Store requests which miss the local L2 Cache within a node may target Main Memory or an L2 Cache on any of the other three nodes.

Figure 2:
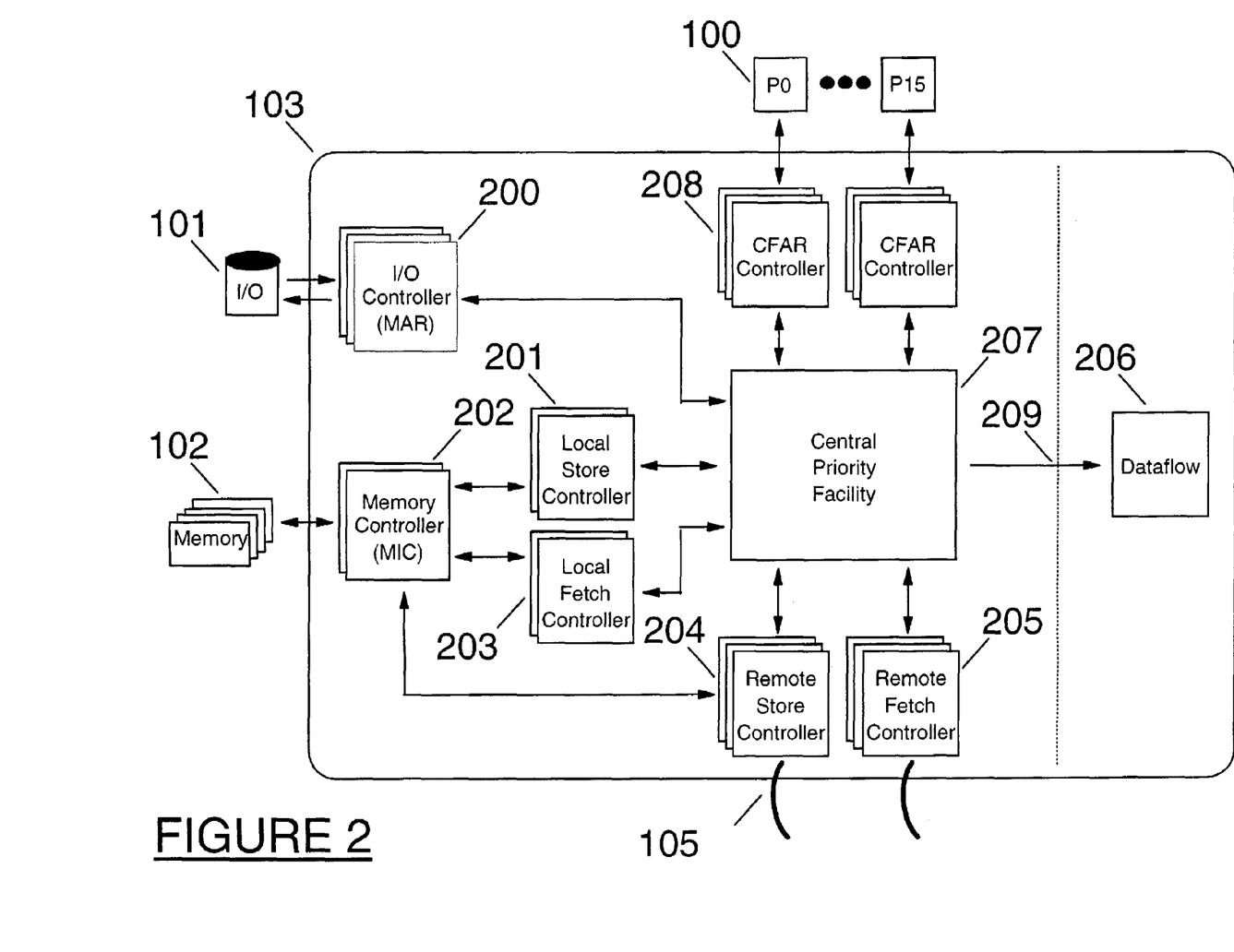
FIG. 2 depicts the basic elements in a node within a multi-nodal system. The interface controllers, central priority (pipeline), fetch/store requesters, and segregated dataflow are highlighted.

FIG. 2 details the basic functional units in a System Controller Element (103), with the Central Processors (100) and I/O devices (101) making data fetch and store requests through the Central Priority Facility (207), which is core to the centralized pipeline, within their respective System Control Element (103), through the respective interface controllers (208) (200). Fetches that miss the local L2 Cache are processed by the Local Fetch Controllers (203) within the SCE. These controllers are responsible for initiating data accesses from main memory (102) through the memory interface controller (202). In the case of store requests, those initiated from the Central Processors (100) always hit in the L2 Cache and thereby terminate the operation with the deposition of the updated data into the cache. This is due to architectural design requirements pertinent to this system design whereby the Central Processors acquire exclusive ownership of data prior to updating the data as part of store requests. Although Central Processors are required to own the data prior to update, this rule does not apply to I/O devices (101). Thus store requests initiating from I/O devices may or may not hit in the L2 cache. For those that encounter an address miss in the local cache, the operations are processed by the Local Store Controllers (201) within the SCE. These controllers handle the transfer of data to main memory through the memory interface controller as part of a standard memory write operations.

As mentioned in the description of FIG. 1, Fetch and Store requests which miss the local L2 Cache within a node may target Main Memory or an L2 Cache on any of the other three nodes.

Requests that meet this criteria use the ring fabric (105) to interrogate remote nodes to determine if the address resides in one of the remote L2 cache, while performing any and all necessary system coherency actions. This is done through the Remote Fetch (205) and Remote Store (204) controllers, which act on behalf of the Local Fetch (203) and Local Store (201) controllers on the remote nodes. When a local operation misses in the local cache, a command and address are sent out on the ring fabric, which is then received by these remote fetch and remote store controllers on a remote node. Depending on the operation type, a remote fetch or remote store controller will begin processing the operation on the remote node. After the remote controller interrogates the node it is on, it then proceeds to send the same command and address out on the ring fabric to the next node with a partial response, indicating the state of the target address in the local cache, until the node which is diagonal to the originating node receives messages from both directions on the ring fabric. On the diagonal node, the controller interrogates the local L2 cache and merges the partial responses into a final response which is then sent out on the ring fabric in both directions. If one of the nodes reported a cache hit on a remote node, the respective fetch or store operation is completed in the same manner as it would be on a local node, but in this case it is completed across the ring fabric. If the operation misses all the caches (local and remote), it will eventually terminate at the node in which the target main memory resides. The target main memory is determined by address bits.

In FIG. 2 the functionality in the System Control Element is segmented into a control section and data section as can be seen through the vertical dashed line in the figure separating the dataflow (206) from the rest of the elements in the System Control Element (103). The control section contains all of the controllers and the address sections that are used to determine if a particular address exists on a given node. When it does and a transfer of data to a Central Processor (100), I/O Device (101), or Remote Requester (204) (205) is required, a command is sent to the dataflow (206) through a unidirectional crosspoint bus (209). In this manner, the dataflow acts as a slave device to the control flow in that all transfers of data within the dataflow are initiated as a result of commands sent to the dataflow from the control flow. No communication in the opposite direction is required. Through these crosspoint commands data can be returned to the Central Processors, I/O devices, Main Memory, and Remote Fetch/Store Controllers through data buses going to each respective interface.

Figure 3:
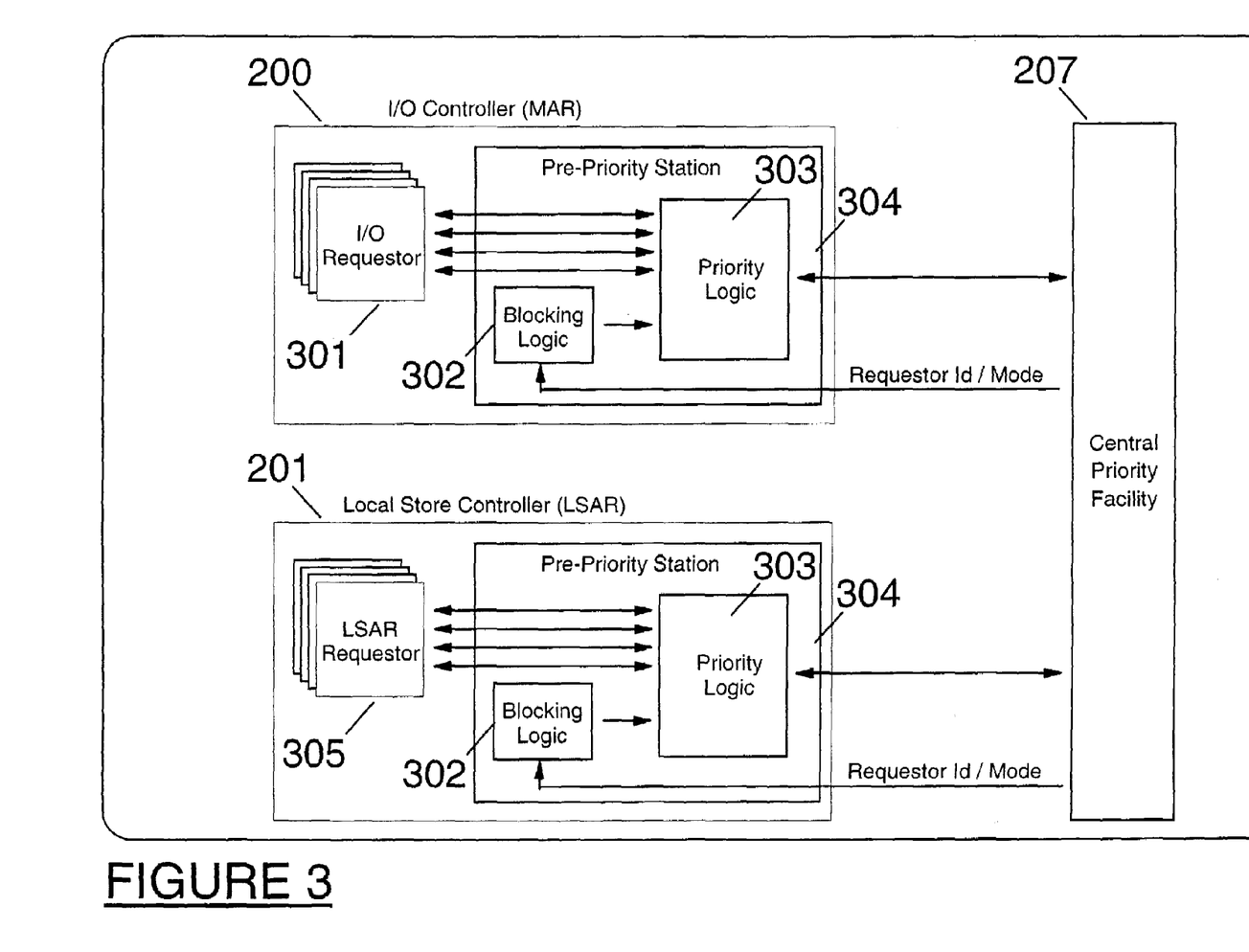
FIG. 3 details the interaction of the I/O requesters and the Local Store Requesters with the central priority facility, through the use of pre-priority stations. Highlighted in this figure is the blocking logic which is core to the invention and methodology disclosed herein.

With this basic understanding of the System Control Element, FIG. 3 turns our attention to the relationship between the I/O Controller (200) and the Local Store Controller (201) with respect to each other and the Central Priority Facility (207). As each of these requesters attempts to complete their normal operations, they raise requests and receive priority grants from the Central Priority Facility, effectively making 'pipe passes' through the centralized pipeline. Each time a given requester receives a priority grant from the Central Priority facility, information pertaining to the requester's request is broadcast to the interface controllers within the System Control Element, as previously mentioned.

This broadcast typically contains several key pieces of information used by the requesters in a pipelined system as a method of maintaining system coherency, generating data movements, indicating if a granted requester's pipe pass was valid, resolving points of contention, polling the local cache for directory information, etc . . . The broadcast fields which are critical to our discussion include the pipe valid, pipe requester id, and the pipe mode. In large SMP systems there are numerous other fields typically broadcast with each pipe pass which will not be discussed here but are common knowledge to those familiar in the art.

The most commonly broadcast field in any pipelined system is the pipe valid field. It is used to indicate if the remaining fields associated with the given pipe pass are valid. Through this single facility, requesters in the system know if the remaining fields should be used and doubly, it functions as an easy method for canceling a given pipe pass without the need to zero out all of the remaining pipe fields.

The next field of importance to our discussion is the requester id field, which is used to inform other requesters in the system as to which requester was given priority in the pipeline. Given that in SMP system, there are a large number of requesters and resources, the resources typically use the requester id to ensure that they are loaded by a requester and not by a resource which might be making a pipe pass. This field is also used typically in system coherency and several other areas outside of the scope of our invention which will not be discussed here. From the perspective of our invention, the requester id field is used to communicate if a Local Store Controller or I/O Controller is currently in the pipe.

Lastly, the pipe mode field is used by the requesters and resources in a system as a method of communicating the state of a requester's or resource's internal state machine during the time of their pipe pass. For some requesters this can be translated into data movement commands being sent over to the dataflow, while for other requesters this is used to trigger directory updates.

The main item to note here is that these fields are commonly used in a pipelined system as a means of communicating information about a particular requesters or resources pipe pass to the rest of the requesters and resources in the system. Further information related to broadcast pipeline information can be found in prior IBM SMP patents.

In the case of the I/O requesters (301) and Local Store (LSAR) Requesters (305), working on behalf of the I/O Devices (101), they have to raise requests to a Pre-Priority Station (303) as part of their process of receiving priority from the Central Priority Facility (207). The Pre-Priority Station normally selects one out of the set of requesters by use of standard Priority Logic (303) and presents the request to the Central Priority Facility. When the condition arises that a requester is given priority to use a shared resource, the preexisting broadcast information from the Central Pipeline is used to activate Blocking Logic (302) in the requesters Pre-Priority Station (304). This then feeds into the Priority Logic (303) to actively prevent any of the other requesters in the stations that require the shared resource from being considered for priority selection to the Central Priority Facility until the window in which the shared resource is in use has passed. This takes a given but varying number of cycles which the Blocking Logic determines from the broadcast information presented to it from the Central Priority Facility.

In following this methodology, the Central Priority Facility does not have any requests presented to it which might be invalid or have the possibility of granting a request which would have to be canceled or rejected due to the conflict on the shared data path. This effectively simplifies the design of the Central Priority Station by reducing the contention that it has to manage by deferring the management logic to remote priority stations. Also by using existing standard broadcast information which the central priority sends to all requesters in a standard pipelined system and grouping similar lower priority requesters into pre-priority stations, this methodology reduces wiring contention and timing issues commonly encountered in the design of a Central Priority Facility. All of this results from the design of intelligent detection logic in pre-priority stations that use preexisting information commonly available in any type of pipelined system architecture.

Figure 4:
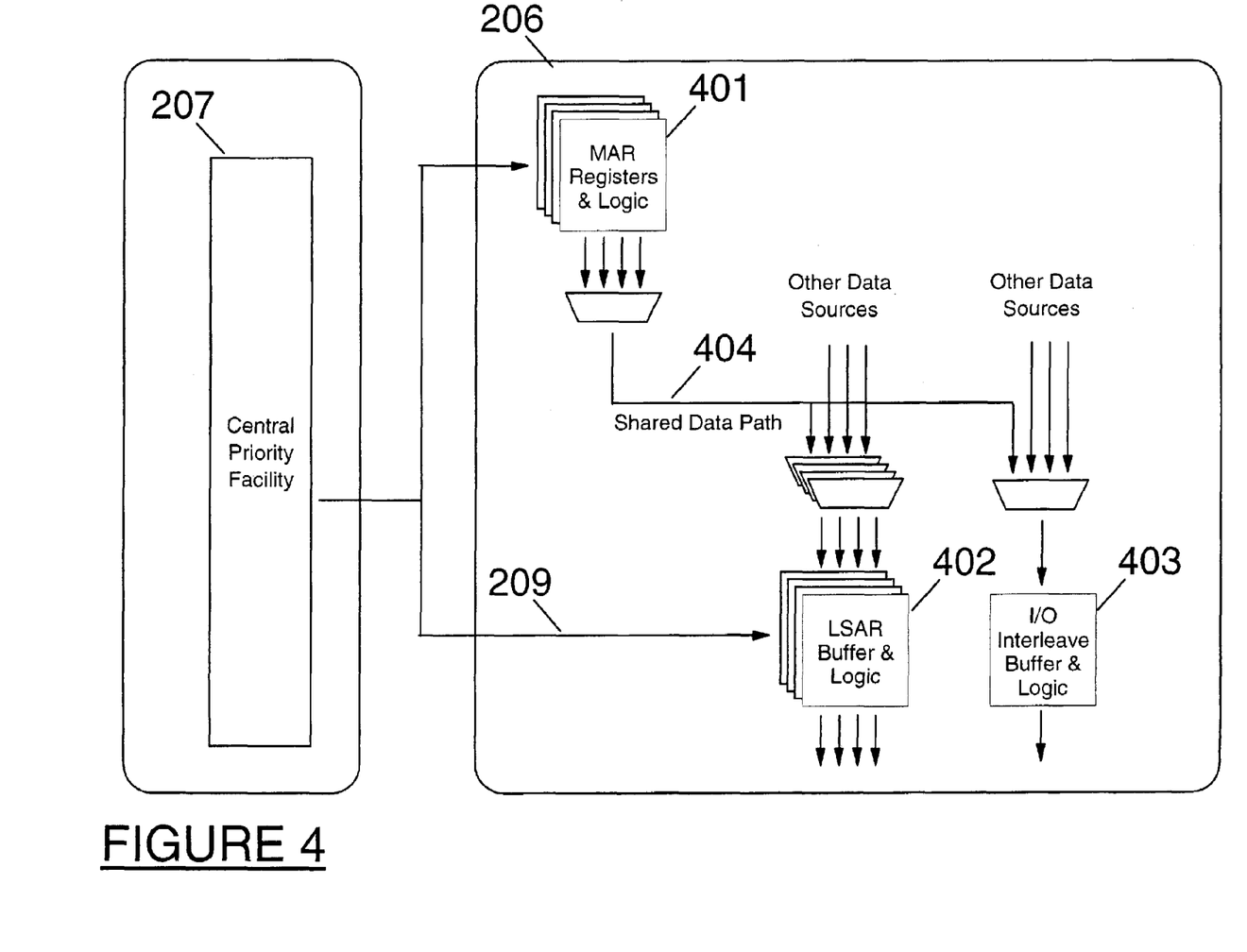
FIG. 4 depicts the interaction between the central priority facility and the segregated dataflow, which acts as a slave to the control side of the system. Within the dataflow, the shared datapath between the I/O requesters and the Local Store Requesters is emphasized.

In switching our attention to FIG. 4, the details of the dataflow (206) can be seen. It receives from the Central Priority Facility (207) a crosspoint command through the use of the crosspoint bus (209). This command is used to initiate data transfers from one set of resources to another on the dataflow, since it is the only source of communication between the control flow and the dataflow. In this case, the data transfer which is initiated on behalf of the LSAR Requesters would cause a data transfer from the MAR Registers (401) to the LSAR Registers (402). In the case of the I/O Requesters, the data transfer would be made from the MAR Registers to the I/O Interleave Buffers (403).

The main point in this figure is that in the dataflow, there is no active control to prevent the collision on the Shared Data Path. This is all actively managed from the control flow through the Blocking Logic depicted in FIG. 3. Therefore, if two crosspoint commands were sent over to the dataflow indicating a transfer from the MAR Registers to the LSAR Registers and I/O Interleave Buffers within a small number of cycles, either a data collision would occur or incorrect data would be sent into one of the facilities. The only mechanism for preventing this is the Blocking Logic previously discussed.

In addition to this, through the use of active management on the control side, the dataflow can be simplified in complexity and design. In this case, common logic blocks that are readily available to any designer can be used to recreate this invention and no custom logic is required. As a result, the portability and ease of following this methodology is increased.

Figure 5:
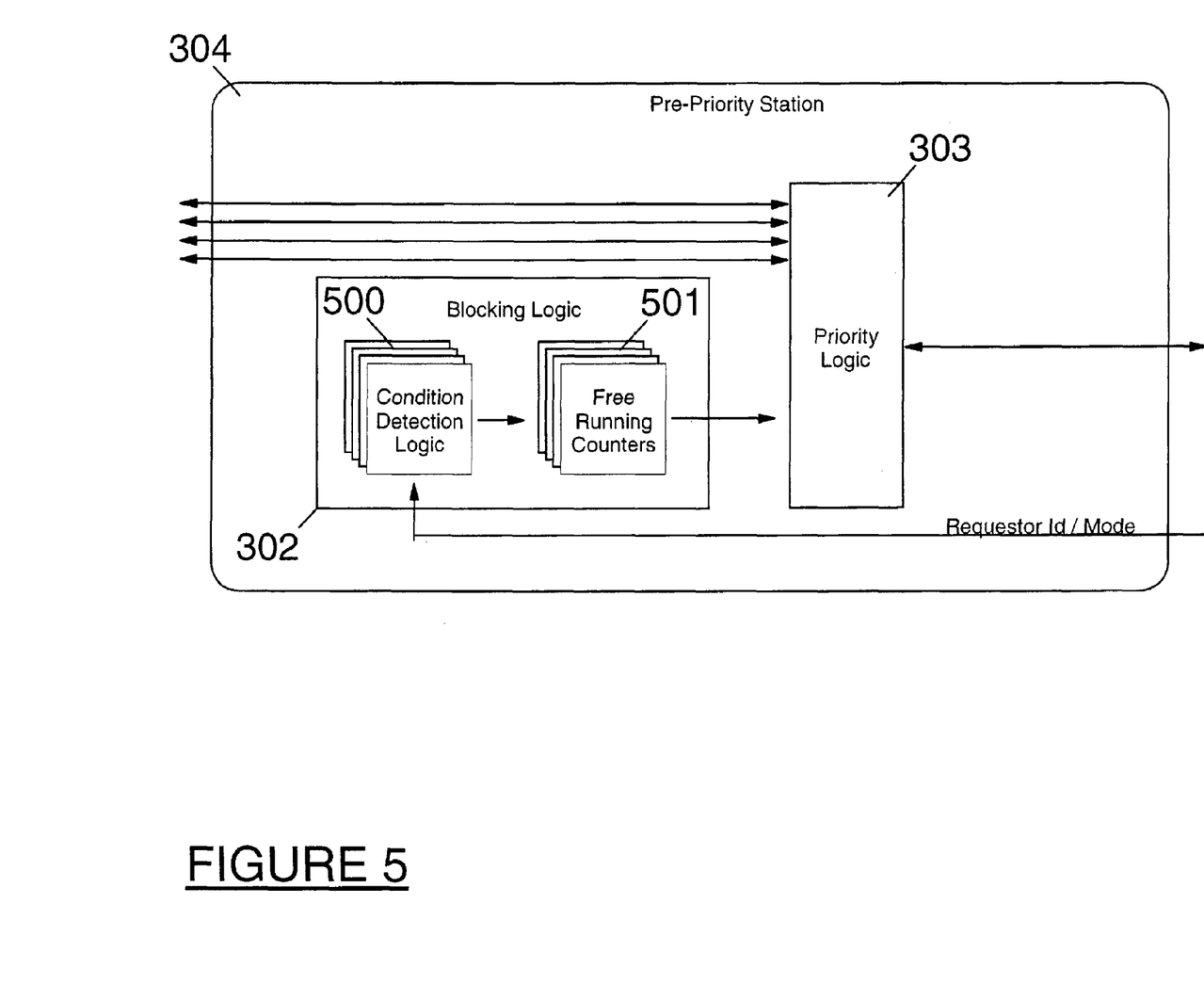
FIG. 5 highlights the blocking logic in the decentralized pre-priority stations, breaking it out into a set of detection logic and independent, programmable, free-running counters.

In FIG. 5, the Blocking Logic (302) is separated into the Condition Detection Logic (500) and the Free Running Counters (501) which are used to ensure that the shared data path (404) from FIG. 4 is 'tagged' as in use for the appropriate amount of time. Through this figure, the importance of the independent Blocking Logic is stressed, with its relationship to the Central Priority Facility.

It is shown that the blocking logic in the preferred embodiment receives the requester id and mode of the requesters that was granted to make a pipe pass, from the Central Priority facility. These two signals are used in this case to detect that a shared resource is going to be utilized, triggering a free-running counter to be activated for a given number of cycles in this case. The critical point shown here is not the detection logic, but the use of a common signal which is sent from the central priority facility to all of the requesters in the system, rather then using a custom signal from the central priority facility to the pre-priority stations. In this manner, the Central Priority facility does not have to handle any of the resource availability management and through the use of standard signals, is essentially unaware of this facility or its management.

In this manner, this implementation can be more easily scaled to allow a plurality of requesters to use a multitude of shared resources without placing any special physical design issues on the central priority station, due to the scalable nature of this methodology. Also, the premise of our first preferred embodiment, a method of managing shared resources on a remote facility through independent management facilities centered around a central priority station, has been demonstrated.

Figure 6:
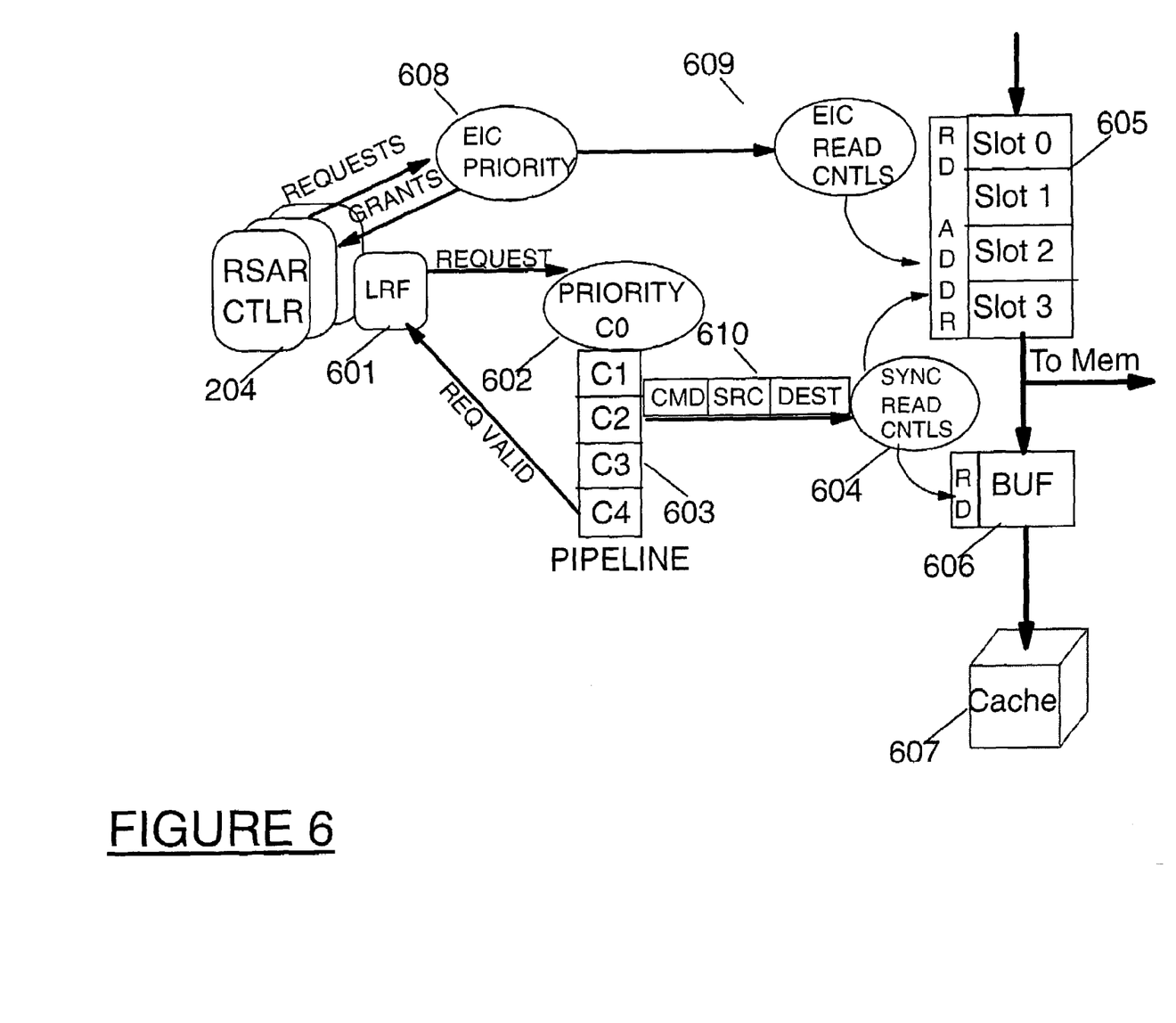
FIG. 6 depicts a system comprising dedicated and shared data flow elements, and the interaction of the control flow managing said elements

Turning our attention to FIG. 6, the next part of our invention contemplates a data flow comprising of both dedicated and shared elements. In our preferred embodiment, elements are shared by a multitude of Remote Storage Access Register controllers (204), hereto forth referred to as RSAR controllers. These controllers are responsible for performing remote storage access operations involving both a shared cache and main memory. RSAR performs these operations on behalf of CP and I/O controllers on remote nodes in the SMP system depicted in FIG. 1. In addition to initiating data transfers, the RSAR controllers must also perform coherency functions such as updating ownership information in the shared cache directory. Although the preferred embodiment depicts the present invention using RSAR controllers, one skilled in the art can envision how any type of controller that must incorporate data transfers with coherency functions could be substituted.

In our preferred embodiment, RSAR controllers handle a multitude of operations such as casting out aged data from a remote cache to main memory and storing data into the cache or main memory on behalf of remote I/O controllers. This involves RSAR receiving an incoming command, decoding it, and then initiating a state machine to perform the necessary coherency actions and data transfers. The preferred embodiment contemplates four RSAR controllers (204) which have an affinity to one of the remote nodes in FIG. 1. The four instances of RSAR controllers are identical, and each is capable of performing all the same operations completely in parallel. In order to allow all four RSAR controllers to process incoming data, a Quad Buffer (605) is employed as a temporary repository. The Quad Buffer (605) has a single read and write port, but contains four slots. Each slot is deep enough to hold 256 bytes of data, which is the largest packet of data a single RSAR controller can process in one operation. The preferred embodiment utilizes a single Quad Buffer as opposed to four separate 256 byte buffers in order to improve layout efficiency. Since the preferred embodiment incorporates the Ring Structure depicted in FIG. 1, a Ring Interface Controller manages the Ring Data Bus and only permits one data transfer on the ring at a time. Therefore only one of the RSAR controllers can be receiving incoming data at any time, thus allowing all four to share the inbound data path. However, since an RSAR controller can't guarantee that the incoming data will be transferred to the destination before a second data transfer arrives, the Quad Buffer must enlist a slot with a dedicated affinity to each RSAR controller.

Connected to the Quad Buffer's read port is a shared output data path which carries data to the main memory interface or to a single shared 256 byte Cache Interleave Buffer (606). The present invention teaches a method by which all four homogenous RSAR controllers share the single Cache Interleave Buffer (606) with each other as well as a second method by which the RSAR controllers share the outbound data path with an unrelated External Interface Controller.

Upon receipt of a new command, RSAR decodes the command and immediately makes a transition to its initial state. In the preferred embodiment, the initial state of all controllers is referred to as Mode 0. Various Modes are used to signify different states of a controller, and each Mode value denotes a specific coherency action such as updating ownership of a data block, invalidating a directory entry or initiating a data transfer. The present invention allows data transfers to be the sole action for a particular Mode or to be combined in the same Mode with coherency actions.

Each time a controller changes from one Mode (or state) to another, it must request and gain access to the Central Pipeline (603). This Central Pipeline (603) is a multistage synchronous pipeline which can permit a different requester to enter each clock cycle, thus allowing several operations to overlap simultaneously. Each stage of the pipeline correspond to different coherency actions such as directory updates, directory accesses, cache accesses, address interlocks, etc. Arbitration among the plurality of controllers depicted in FIG. 2 is performed by the Priority (602) logic shown in FIG. 6.

The priority station in the preferred embodiment is actually a multilevel arbiter which performs pre-priority selections among groups of homogeneous requesters, followed by a final selection among the group of heterogeneous requesters. Upon receiving a grant from the Priority (602) logic, the controller successfully enters the C0 stage of the Pipeline (603). Each subsequent clock cycle advances the requester through the various pipe stages whereby the operation may or may not traverse all stages successfully. In cases where address or resource conflicts occur, the requester may have to terminate the current pipe pass, request arbitration, and repeat the pipe pass. Eventually, the requester should reach the C4 pipe stage at which point the pipe pass is considered successful and the controller can advance its state machine to the next mode.

In the case of the RSAR controllers, operations involving data transfers require the use of up to three different Modes. Mode 0 is always used since it's the initial state for all operations, and it is the only Mode used for remote cast outs of aged cache data. Mode 0 is also the only state used for remote I/O stores destined for an external interface such as the main memory. However, for remote I/O stores destined for the shared cache, RSAR controllers require a Mode '10'x and a Mode '0E'x pass. The present invention introduces several novel concepts including:
- a Localized Reservation Facility (601) to manage the shared resources among the four RSARs,
- utilizing Modes solely for data transfers between temporary storage elements such as buffers and
- allowing synchronous data transfers initiated via the pipeline to share data flow elements with asynchronous data transfers initiated by unrelated controllers.

Turning our attention to FIG. 6, I/O Stores which hit in the cache require the most state transitions since the remote store data must temporarily enter the appropriate slot of the Quad Buffer (605), transfer to the shared Cache Interleave Buffer (606), then ultimately move into the correct row and compartment of the shared associative cache (607). Our invention permits all four RSAR controllers to share the read port of the Quad Buffer (605), the single 256 byte Cache Interleave Buffer (606) and the data path between them.

First, RSAR makes an initial Mode 0 pass to perform certain system level coherency functions which include determining that the store data hits in the shared cache (607). Eventually, the data arrives in the appropriate slot of the Quad Buffer (605), at which time the RSAR controller makes a state transition to Mode '10'x. The present invention controls this Mode transition through the use of a Localized Reservation Facility (601) which first requires the shared Cache Interleave Buffer (606) and read port of the Quad Buffer (605) to be reserved in advance. Once the shared data flow elements are properly reserved for that RSAR, then the state changes, and a Mode '10'x request is sent to the Priority logic (602).

The Mode '10'x pipe request may not be granted immediately. Our invention permits other higher priority RSARs to supersede the Mode '10'x request and enter the pipeline ahead of the Mode '10'x I/O Store provided they don't require use of the shared data flow elements. However, if two or more RSARs require these shared elements, the Localized Reservation Facility (601) ensures that only one of the RSARs will make a Mode '10'x request and the others will have to wait. In this manner our invention permits efficient operational processing in two ways. First, it only allows an RSAR to initiate a Mode '10'x pass if the shared data flow elements are available. Without the LRF, RSARs would be free to enter the pipe only to encounter a resource conflict against another RSAR already using the shared element. This would require the thwarted RSAR to recycle and try again. One could easily envision how a multitude of RSARs in a large SMP system such as ours would negatively impact operational throughput if the pipe utilization were sacrificed for repeated resource conflicts.

Secondly, the preferred embodiment employs several priority schemes for arbitrating among the plurality of RSARs in the system. These priority schemes are designed to ensure fairness and prevent operational deadlocks. The LRF seeks to maintain the validity of these priority schemes by not automatically preventing other RSARs from making non Mode '10'x requests. The LRF will only lock out other RSARs seeking to make Mode '10'x passes, and does allow RSARs not making Mode '10'x requests to enter priority along with the Mode '10'x RSAR, thereby yielding to the Priority (602) logic for final arbitration.

Upon making a successful Mode '10'x request into the central pipeline (603), our invention utilizes a synchronous Interleave Control Bus (610) to send a simple command to the data flow. This control bus is historically used throughout the data flow of the preferred embodiment to transfer the data into and out of the shared cache (607). The present invention expands the use of this bus to include buffer to buffer transfers as well. In this case, the source field of the command indicates the identity of the Quad Buffer (605) and slot from which the data is to be read. Additionally, the destination field indicates the data is to be transferred to the shared Cache Interleave Buffer (606).

Upon receipt of the Interleave Control Bus (610) command, the Synchronous Read Controls (604), embedded in the data flow, decode and interpret the command and then initiate the data transfer. Since the present invention prevents collisions back in the Local Reservation Facility (601), the Synchronous Read Controls (604) consist of simple counters which increment the read address of the Quad Buffer (605) and Cache Interleave Buffer (606) by the appropriate number of clock cycles for the desired length of data. Since the LRF takes care of managing the shared resource ahead of time, our invention permits the data flow to be constructed from simple components such as buffers, registers, muxes, counters, DRAMs, etc. without the need for complex control logic.

Since system performance is vital in large systems, such as IBM eServers, every effort must be made to transfer data into and out of shared data flow elements as quickly as possible. Our invention further contemplates a Local Reservation Facility (601) capable of automatically initiating a sequence of pipe passes in order to facilitate data movement through the Cache Interleave Buffer (606). In the preferred embodiment, RSAR must transition to Mode '0E' x in order to write data into the shared cache (607). It can't use Mode '10'x because Mode '10'x only initiates a buffer to buffer data transfer and does not perform any coherency functions. For I/O Store operations, whenever data is written to the shared cache (607), the directory must also be updated to indicate ownership of the data block by an I/O device. Mode '0E' x simultaneously updates the directory ownership and initiates a data transfer from the Cache Interleave Buffer (606) to the cache (607).

Our invention maximizes data flow efficiency by automatically initiating a Mode '0E' x pipe request once the Mode '10'x pass reaches the C4 stage of the pipeline, thereby indicating a successful Mode '10'x pipe pass. The shared Cache Interleave Buffer (606) is held in reserve until the Mode '0E' x pass reaches its C4 stage thereby signaling a successful Mode '0E' x pipe pass. This implies that a synchronous Interleave Control Bus (610) command was sent instructing the data flow to transfer the data out of the shared buffer and into the cache. As soon as that transfer begins, the shared Cache Interleave Buffer (606) can be made available for another RSAR to use.

In addition to the Cache Interleave Buffer (606), the present invention also teaches a method for sharing a data flow element between synchronous and asynchronous controllers. As previously described, I/O Stores that hit in the cache utilize a series of data transfers which are synchronized by a centralized pipe line. This affords the LRF the advantage of being able to calculate the number of clock cycles necessary to reserve the buffer. Additionally, the synchronous Interleave Control Bus (610) ensures only one data transfer can be initiated on any given clock cycle.

However, RSAR also processes operations which need to store data into the main memory. Two examples of these are I/O Stores which miss the shared cache and LRU Cast Outs of aged cache data. In these situations, RSAR must make a request to the External (Memory) Interface Controller (608), which arbitrates requests from controllers throughout the System Control Element. Once the external memory interface is available for a data transfer, the EIC issues a grant to RSAR indicating the data transfer is forthcoming. Since the data resides in the Quad Buffer (605) which has only a single read port, the potential exists for a Mode '10'x operation to already be in progress for a different RSAR.

A traditional method for resolving this potential conflict would be to utilize cross communication between RSAR and the EIC to indicate buffer availability, which the EIC could factor into the priority algorithm in determining whether to issue a grant to RSAR. Although this method would indeed prevent Quad Buffer read port collisions, it would require an undesirable number of chip level wires to accommodate the 24 RSAR controllers on the chip. One of the goals of the present invention is to provide a scalable solution in order to allow future increase in the number of RSAR controllers. As the number of RSARs expand beyond 32 or 48, the traditional approach changes from undesirable to impractical. The present invention employs a novel approach to solving this problem without the need for any chip wires beyond the existing request and grant signals.

In the preferred embodiment, the EIC accepts requests from a plurality of controllers and is allowed to issue a grant anytime after the request. This can be as soon as one clock cycle or many hundreds of clock cycles later. It would be detrimental to system performance to inhibit the other RSARs from using the Quad Buffer while a current RSAR is awaiting a grant from the EIC. Therefore, the LRF (601) permits synchronous Mode '10'x pipe passes to interrupt outstanding external memory interface requests, in such a way that the memory request is temporarily rescinded until the Mode '10'x and Mode '0E'x passes are complete. Then the memory request is resurrected. Once the EIC issues a grant, an interlock in the LRF prevents any Mode '10'x requests from initiating until the EIC Read Controls (609) have completed reading the data out of the Quad Buffer (605) and sent it to the memory data bus. Once again, since the LRF ensures no other RSAR will commandeer the Quad Buffer upon receipt of an EIC grant, the External Memory Interface Controller can employ a simple control bus to the data flow to initiate the buffer read operation. Furthermore, since the buffer management is completely contained within the LRF, the present invention is capable of interacting with a plurality of memory or other interface controllers.

Figure 7:
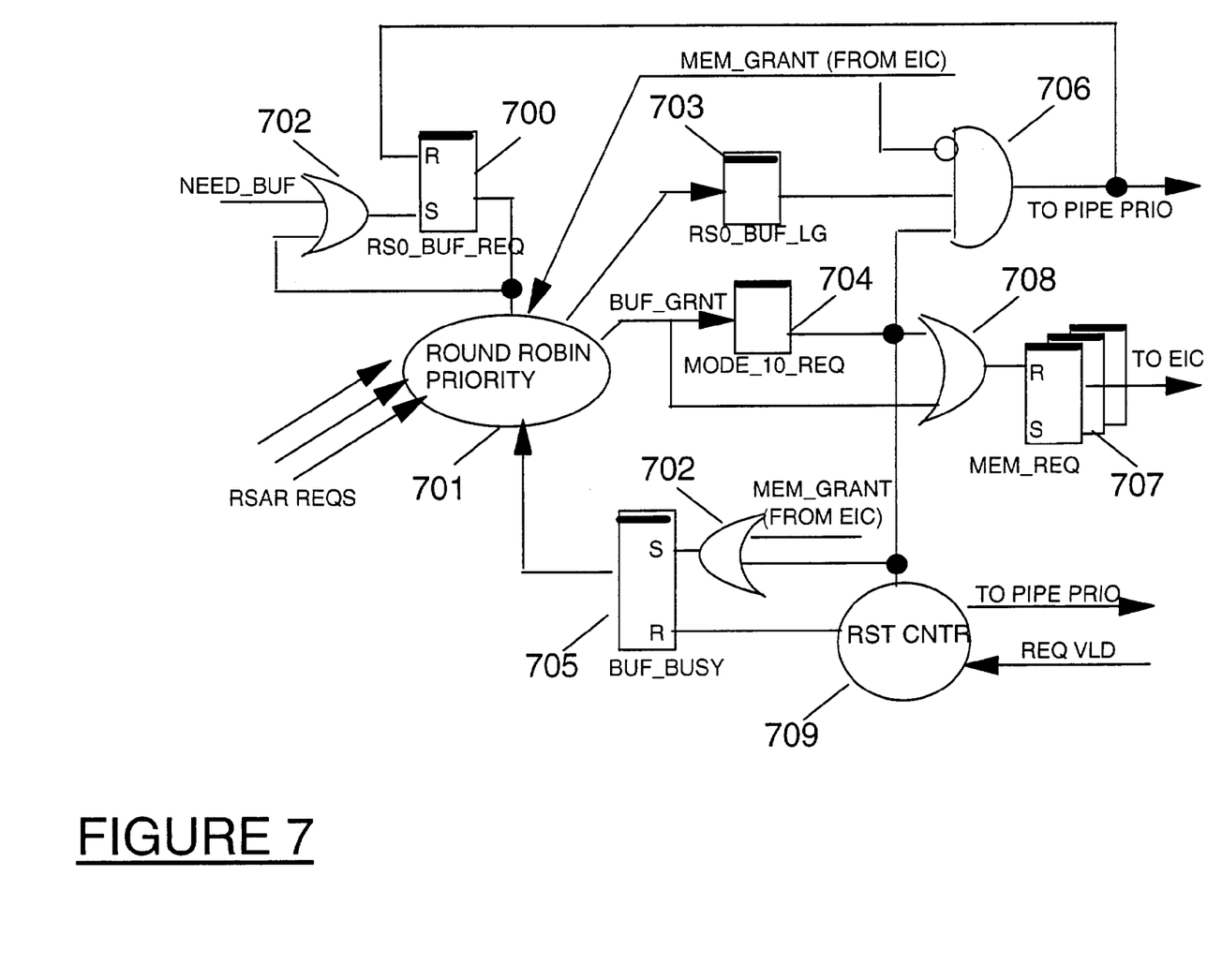
FIG. 7 depicts the Local Reservation Facility.

FIG. 7 depicts the Local Reservation Facility employed in the preferred embodiment. When the RSAR state machine is about to transition from Mode 0 to Mode 10, it sends a need_buf signal, which in turn sets the buf_req latch (700). This latch employs a reset dominant circuit in conjunction with OR gate (702) to hold the latch active once it's set, until such time that the reset condition is activated. The preferred embodiment permits each RSAR to set its own buf_req latch, and the output of all the latches feed a common priority (701) station. Our invention permits any type of priority or arbitration to be used, although the preferred embodiment employs a round robin scheme.

Once the priority (701) station selects a particular RSAR, the buf_lg (703) latch corresponding to that RSAR is set simultaneously with the mode_10_req (704) latch. Since Mode '10'x requests are synchronous, there only needs to be one mode_10_req (704) latch as only one RSAR can make a Mode 10 request to the central pipeline. This mode_10_req (704) latch also serves as the interrupt mechanism for any pending memory requests. The buf_grnt and mode_10_req latch are OR'd together in the OR gate (708) which feeds the reset circuit of every RSAR's mem_req (707) latch. In this manner, once a buf_req is granted for one RSAR, no further memory requests are permitted for other RSARs until the shared buffer is relinquished.

In addition to resetting the mem_req (707) latch, the mode_10_req (704) latch is also used to set the buf_busy (705) latch which is a set dominant latch that holds its value until such time that the reset condition is met with no simultaneous setting conditions active. The output of the buf_busy (705) latch is fed to the priority (701) station to prevent any further grants from being issued to other RSARs. The mode_10_req (704) latch is also combined with the buf_lg (703) latch for this particular RSAR and the mem_grant from the EIC (608) in AND gate (706) to reset the buf_req (700) latch. The output of the AND gate (706) is sent to the pipeline priority station to trigger a Mode '10'X pipe pass request. This reset mechanism is an important part of our invention because it acts as the interlock between the synchronous Mode '10'x requests and the asynchronous external memory interface requests. The AND gate ensures that the only way the buf_req (700) latch may be reset is if the EIC grant is not issued. If the grant does arrive on the cycle the mode_10_req latch is set, the memory operation will proceed and the Mode '10'x request to the central pipeline is suppressed. In addition, the mode_10_req (700) latch remains active, but will be unable to obtain a grant from the priority (701) station due to the incoming memory grant. The memory grant is also OR'd with the mode_10_req latch into the setting condition of the buf_busy (705) latch. Thus, either an external memory grant or a Mode '10'x grant results in the buffer being reserved and made unavailable to any other RSAR.

The final component in the Local Reservation Facility in FIG. 7 is the reset_counter (709) logic. This logic provides the means to reset the buf_busy (705) latch which permits the priority (701) station to resume issuing grants for Mode '10'x requests. The reset_counter performs two functions in the present invention. First it monitors the valid signal from the C4 stage of the central pipeline (603) to keep track of successful pipe passes. Since the preferred embodiment begins the data transfer with a Mode '10'x request, the reset_counter triggers off of the mode_10_req (704) latch to begin monitoring the pipe. Once it detects the C4 valid signal, it immediately makes a Mode '0E'x request to the central pipeline for that particular RSAR. This improves system performance by efficiently moving the data through the shared resource in a streamlined fashion. Once the reset_counter detects the next C4 valid signal (corresponding to the Mode '0E'x pass), it begins counting down a predetermined number of cycles to correspond with the propagation delay between the C4 stage of the pipeline and the Cache Interleave Buffer read controls (604). Our invention contemplates a programmable counter which is customized for any data flow application. As the counter approaches zero, the buf_busy (705) latch is reset and the reservation cycle can begin again.

In the preferred embodiment the mode_10_req (704) latch is necessary because the external memory interface controller can issue a grant one cycle after a memory request is rescinded. If the grant was always issued on the same cycle as the request, the mode_10_req latch could be eliminated. One skilled in the art could appreciate how alternate embodiments of the present invention can be contemplated to adapt to virtually any external interface protocol. For example, if an external interface required several cycles of delay in order to respond to a request, then the mode_10_req latch could be replaced with a series of latches to account for the appropriate cycles of delay.

Our detailed description explains the preferred embodiments of our invention, together with advantages and features, by way of example with reference to the drawings.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for resource management among distributed priority stations, comprising the steps of
   providing a decentralized, distributed resource management among distributed priority stations having free-running blocking logic for controlling segregated dataflow in a computer system having a centralized pipeline having no communication between said distributed priority stations, and
   sharing data in the computer system with a segregated dataflow that is physically segregated from said centralized pipeline, and processing operational control sequences in said pipeline while manipulating data packets only in said segregated dataflow as a result of commands sent to the segregated dataflow from the control sequences.

2. The method according to claim 1 whereby a shared segregated dataflow is managed by a multitude of decentralized, distributed priority stations in said centrally pipelined computer system and, wherein:
   the distributed priority stations have no method of direct communication between each other,
   all communications with the centralized pipeline use existing signals,
   requesters requiring use of the shared resource are required to make a pipe pass to initiate use of said shared resource,
   said pipe pass results in information being broadcast from said centralized pipeline to requesters and said distributed priority stations in the computer system, and,
   said broadcast is used to trigger said free-running blocking logic in said priority stations to prevent use of said segregated dataflow resource until it is available.

3. The method according to claim 2 further comprising:
   remotely managing one or more segregated dataflow elements shared by a plurality of homogenous requesters wherein each requester comprises a local means of reserving said segregated dataflow elements on behalf of one requester, while initiating a synchronous data transfer using a simple command initiated through a synchronous pipeline without requiring advanced reservation or arbitration within said segregated dataflow thereby allowing simple data elements of said computer system to be shared, and
   initiating with a requester pipe passes whereby coherency actions may be performed simultaneously with said data transfer, and
   wherein said data flow initiates data transfers among said shared segregated dataflow elements using simple data movement controls without knowledge of which requester the data belongs to and without the need for collision avoidance or detection logic while said plurality of requesters process storage access operations simultaneously thereby allowing each requester access to said segregated dataflow element utilizing a common priority mechanism.

4. The method according to claim 3 wherein a plurality of homogenous requesters employ segregated dataflow elements comprising a combination of dedicated and shared data paths and storage elements.

5. The method according to claim 4 further comprising
   remotely managing one or more segregated dataflow elements shared by said plurality of homogeneous requesters and sharing segregated dataflow elements with an external interface controller operating completely independently of said homogenous requesters and wherein said homogenous requesters initiate synchronous data transfers utilizing a synchronous pipeline while said external interface controller initiates asynchronous data transfers, and
   a local reservation facility remotely manages asynchronous and synchronous data transfers in a manner by which collisions are prevented, and
   wherein no additional communication is required between said homogenous requesters and said external interface controller beyond a simple request and grant semaphore to gain access to said external interface.

6. The method according to claim 5 wherein a synchronous pipeline is used to initiate one data transfer and wherein subsequent data transfers are queued up to enter the pipeline as soon as the present data transfer completes.

7. The method according to claim 6 wherein said local reservation facility permits subsequent homogenous requesters to enter said synchronous pipeline in order to perform non-data coherency actions while a simultaneous synchronous data transfer is in progress by a second homogenous requester.

8. The method according to claim 7 wherein said local reservation facility permits a sequence of synchronous data transfers to occur using a multitude of shared data path elements in order to maximize efficiency by allowing a write operation for a second homogenous requester to begin using a shared data path element while a simultaneous read operation for a first homogenous requester is still in progress.

9. The method according to claim 8 wherein the segregated dataflow elements are entirely governed by controllers operating remotely and resource management is performed without any of said controllers needing to communicate directly with another of said controllers.

10. The method according to claim 9 wherein said controllers operate completely freely and independently from one another, entirely in parallel while at any point in time they all can be performing operations which require shared resource.

11. The method according to claim 9 wherein said segregated dataflow elements have no active management components for detecting or avoiding collisions.

* * * * *